US007768964B2

(12) United States Patent
Hans et al.

(10) Patent No.: US 7,768,964 B2
(45) Date of Patent: *Aug. 3, 2010

(54) METHOD OF OPERATING A MOBILE WIRELESS NETWORK

(75) Inventors: Martin Hans, Hildesheim (DE); Mark Beckmann, Braunschweig (DE)

(73) Assignee: IPCOM GmbH & Co. KG, Pullach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/221,444

(22) Filed: Aug. 1, 2008

(65) Prior Publication Data

US 2008/0291877 A1    Nov. 27, 2008

Related U.S. Application Data

(63) Continuation of application No. 10/130,867, filed as application No. PCT/DE00/03758 on Oct. 25, 2000, now Pat. No. 7,453,838.

(30) Foreign Application Priority Data

Nov. 22, 1999   (DE) ............................... 199 56 062
Apr. 5, 2000    (DE) ............................... 100 17 062

(51) Int. Cl.
*H04W 4/00* (2009.01)
(52) U.S. Cl. ..................................................... 370/328
(58) Field of Classification Search .................. 370/328, 370/469
See application file for complete search history.

(56) References Cited

U.S. PATENT DOCUMENTS 6,246,878 B1 *   6/2001   Wallentin .................... 455/442

(Continued)

FOREIGN PATENT DOCUMENTS

DE          199 44 334         12/2000

(Continued)

OTHER PUBLICATIONS

3$^{rd}$ Generation Partnership Project; Technical Specification Group Radio Access Network; Packet Data Convergence Protocol (PDCP) Specification (Release 1999).

(Continued)

*Primary Examiner*—Kevin C Harper
(74) *Attorney, Agent, or Firm*—Kenyon & Kenyon LLP

(57) ABSTRACT

A method of operating a mobile wireless network is provided, in which, when there is a relocation, the connection may be continued essentially directly from the latest state before the relocation. User data is transmitted between a mobile station and a first base station, the user data being combined into data units, for example, packet data units, before being transmitted. For transmission of data units, transmission-specific information describing an instantaneous state of the transmission is stored in the mobile station, as well as in a first network unit at a higher level than the first base station. With the relocation of the mobile station from the first base station to a second base station having a second higher-level network unit, the transmission-specific information stored in the first higher-level network unit is transmitted to the second higher-level network unit to continue the transmission after the relocation essentially directly from its latest state.

9 Claims, 2 Drawing Sheets

U.S. PATENT DOCUMENTS 7,006,472 B1 * 2/2006 Immonen et al. ............ 370/332
7,453,838 B1 * 11/2008 Hans et al. .................. 370/328

FOREIGN PATENT DOCUMENTS

| WO | 99 22557 | 5/1999 |
| WO | 99 41850 | 8/1999 |
| WO | 01 20938 | 3/2001 |

OTHER PUBLICATIONS

IETF, RFC 1144, Feb. 1990.
IETF, RFC 2507, Feb. 1999.

* cited by examiner

METHOD OF OPERATING A MOBILE WIRELESS NETWORK

RELATED APPLICATION INFORMATION

This application is a continuation application of U.S. patent application Ser. No. 10/130,867, filed Oct. 7, 2002, now U.S. Pat. No. 7,453,838 which is a U.S. national stage application of PCT international application number PCT/DE00/03758 having an international filing date of Oct. 25, 2000, designating the United States of America, and which claims priority to and the benefit of German Patent Application No. DE 199 56 062.5, filed in Germany on Nov. 22, 1999, and of German Patent Application No. DE 100 17 062.5, filed in Germany on Apr. 5, 2000, the entire contents of all of which are expressly incorporated herein by reference.

FIELD OF THE INVENTION

The present invention relates to a method of operating a mobile wireless network.

BACKGROUND INFORMATION

German Published Patent Application No. 199 44 334 relates to a method of operating a mobile wireless network, in which user data is transmitted between a mobile station and a first base station, the user data being combined into data units, for example, packet data units, before being transmitted.

SUMMARY

It is believed that an exemplary method according to the present invention is advantageous in that, for transmission of the data units, transmission-specific information describing an instantaneous status of the transmission is stored in both the mobile station and in a first network unit at a higher level than the first base station. When the mobile station changes connections from the first base station to a second base station having a second higher-level network unit, the transmission-specific information stored in the higher-level network unit is transmitted to the second higher-level network unit to continue the transmission after the change in connection generally directly from its instantaneous status. In this manner, the data units may be continuously transmitted, regardless of a change in connection. It may not be necessary to reset the transmission-specific information to a starting state when changing connections. Thus, there may be no impairment in the transmission capacity of the wireless transmission between the mobile station and the second base station may not be impaired after the change in connection is not impaired by the transmission of data, this transmission capacity being necessary to restore the transmission-specific information most recently in effect in the second higher-level network unit.

It is believed to be advantageous in that control information is added to the data units before being transmitted. The control information is compressed by differential coding before transmission, a code book being created in the mobile station and in the first higher-level network unit for encoding and decoding the control information, the two code books thus created having identical contents, and the code book stored in the first higher-level network unit being transmitted to the second higher-level network unit with the transmission-specific information when changing connection. In this manner, when changing connection, the second higher-level network unit may receive directly from the first higher-level network unit the code book thus created in the mobile station and the first higher-level network unit during the transmission of data units between the mobile station and the first base station, so that the code book need not be created or constructed after the change in connection, thus making demands on the transmission capacity for transmission between the mobile station and the second base station.

It is believed that another advantage is that, before or during establishment of a connection for the transmission of data units between the mobile station and the first base station, a first signaling information is transmitted from the mobile station to the first higher-level network unit to notify the first higher-level network unit whether the transmission-specific information is to be transmitted to the new higher-level network unit when changing connection to a base station having a new higher-level network unit different from the first higher-level network unit. Alternatively, this first signaling information may be transmitted from the first higher-level network unit to the mobile station, so the that network may decide whether the transmission-specific information is to be transmitted from the first higher-level network unit to the new higher-level network unit. It is believed that this may be advantageous because the first higher-level network unit has information regarding the capabilities and resources of the new higher-level network unit and regarding the fixed network connection over which the transmission-specific information should be transmitted. A selection option may provide, as needed, a transmission of the transmission-specific information from the first higher-level network unit to the new higher-level network unit for a telecommunications connection to be established when changing connection. In addition, the transmission-specific information may be reset at a starting state after the change in connection for the connection to be established. The exemplary method according to the present invention is thus flexible in use.

It is believed that another advantage is that, before or during the change in connection, a second signaling information is transmitted from the mobile station to the first higher-level network unit or from the first higher-level network unit to the mobile station to notify the first higher-level network unit or the mobile station whether in this change in connection the transmission-specific information is to be transmitted to the second higher-level network unit. In this manner, even during a connection, a transmission of the transmission-specific information from the first higher-level network unit to the second higher-level network unit may be provided for a telecommunications connection to be established, or resetting of the transmission-specific information at a starting state may be provided when changing connection, as needed, so that an exemplary method according to the present invention may be flexible in use.

It is believed that another advantage is that data units stored in a buffer memory for control purposes in the first higher-level network unit are transmitted to the second higher-level network unit together with the transmission-specific information when there is a change in connection. In this manner, data units needed for checking the transmission of data units, for example, for error-free transmission, and optionally stored in a buffer memory and to be transmitted repeatedly, are not lost when there is a change in connection.

It is also believed to be advantageous in that transmission-specific information is transmitted over a fixed network between the first higher-level network unit and the second higher-level network unit when there is a change in connection. In this manner, the data rate of the fixed network, which may be higher, may be utilized for transmission of the transmission-specific information, without making demands on the transmission capacity of the mobile wireless network for this transmission.

DETAILED DESCRIPTION

Figure 1:
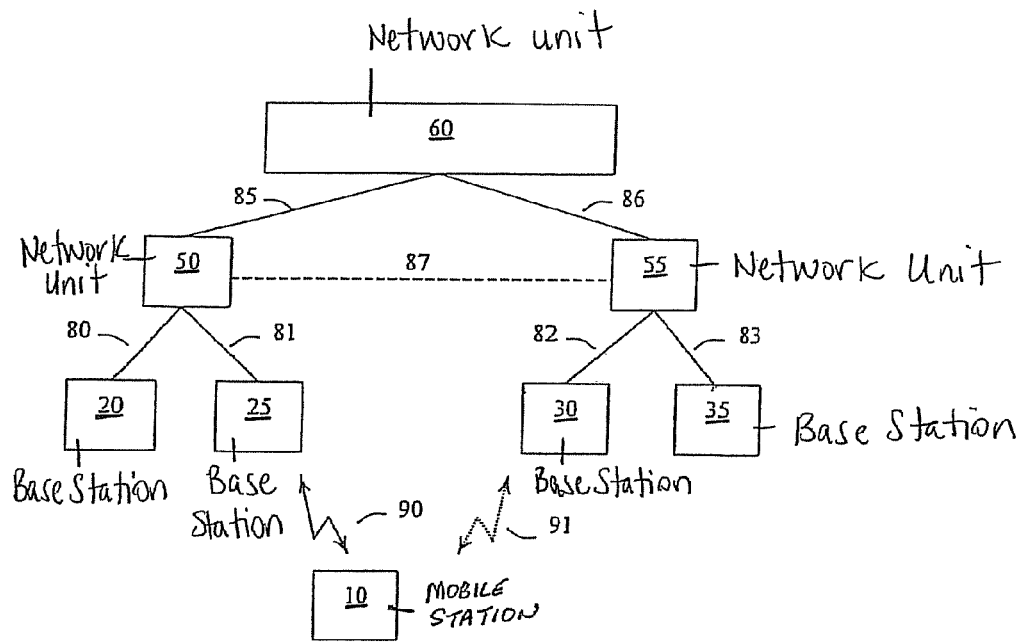
FIG. 1 is a block diagram of a mobile wireless network.

An exemplary embodiment according to the present invention relates to a method of operating a mobile wireless network 1 according to FIG. 1, in which there is a change in connection between two base stations 25, 30, while a connection is established (also referred to as "relocation"). Mobile wireless network 1 may be designed, for example, according to the GSM standard (Global System for Mobile Communications) or according to the UMTS standard (Universal Mobile Telecommunications System). An exemplary method according to the present invention refers to sending transmission-specific information about the connection thus established, e.g., in the form of internal protocol information to a convergence protocol layer 130, 135 between two higher-level network units 50, 55 of cellular mobile wireless network 1.

Cellular mobile wireless network 1 is composed of various units 10, 20, 25, 30, 35, 50, 55, 60, which are physically connected together. FIG. 1 shows a mobile station 10 of mobile wireless network 1, which may be designed, for example, as a mobile telecommunications terminal. Mobile telecommunications terminal 10 is connected via a first air interface 90 to a first base station 25 of mobile wireless network 1. First base station 25 is connected by a first fixed network connection 81 to a first higher-level network unit 50. A second base station 30 is connected by a second fixed network connection 82 to a second higher-level network unit 55. A third base station 20 is connected by a third fixed network connection 80 to first higher-level network unit 50. A fourth base station 35 is connected by a fourth fixed network connection 83 to second higher-level network unit 55. First higher-level network unit 50 is connected by a fifth fixed network connection 85 to a highest network unit 60. Second higher-level network unit 55 is connected by a sixth fixed network connection 86 to highest network unit 60. Optionally, first higher-level network unit 50 may be connected via a seventh fixed network connection to second high-level network unit 55, as indicated with dotted lines in FIG. 1. First higher-level network unit 50, second higher-level network unit 55 and optionally additional high-level network units form "radio network subsystems" (RNS) according to the UMTS standard. The highest network unit thus form a "GPRS support node" (General Packet Radio System Support Node) (GSN) according to the UMTS standard.

In cellular mobile wireless network 1, logical connections are established for data transmission between mobile telecommunications terminal 10 and the other units of mobile wireless network 1 involved in the connection thus established. There are various types of logical connections between mobile telecommunications terminal 10 and the various participating units of mobile wireless network 1 at the same time. These logical connections originate from a hierarchical model in which each hierarchical layer corresponds to a protocol present in both mobile telecommunications terminal 10 and the corresponding unit of mobile wireless network 1 and implements the corresponding logical connection.

Figure 2:
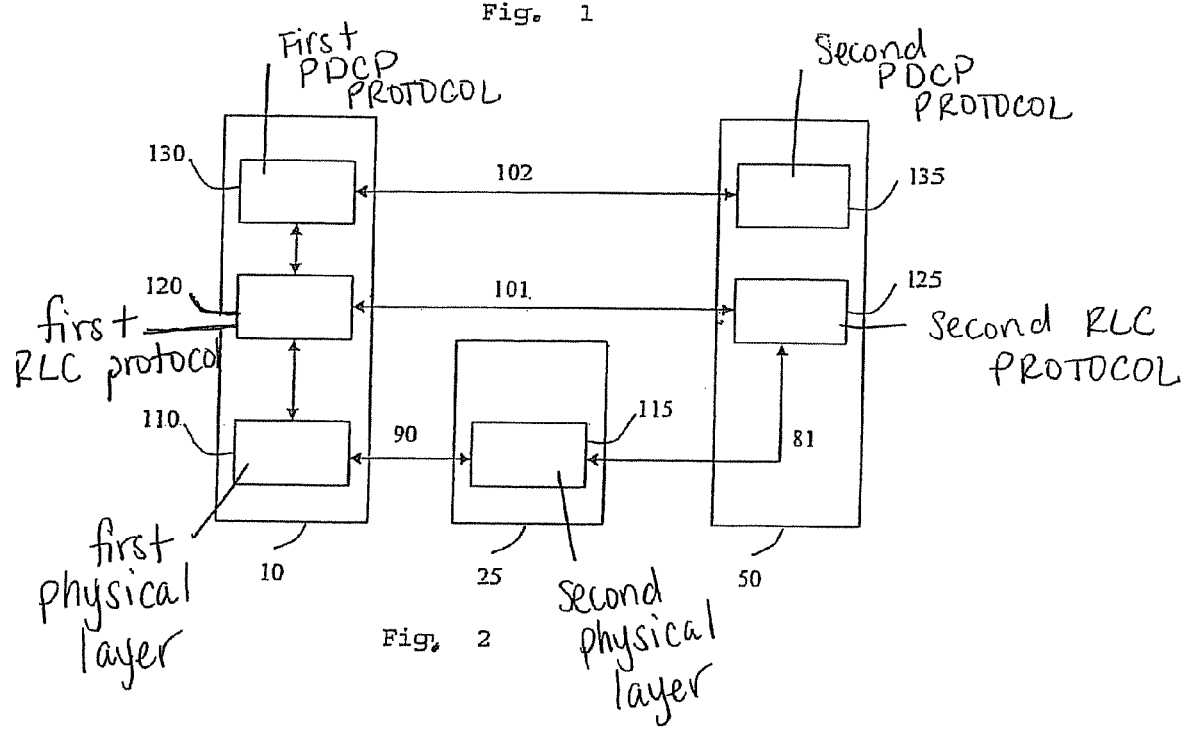
FIG. 2 is a block diagram showing a connection between a mobile station and a first higher-level network unit over a first base station before a change in connection.

FIG. 2 illustrates exemplary logical connections between mobile station 10 and first higher-level network unit 50, as well as connections between mobile station 100 and first base station 25. The lowest hierarchical layer in this hierarchical model is formed by a first physical layer 110 in mobile telecommunications terminal 10 and a second physical layer 115 in first base station 25, which implement a physical connection corresponding to first air interface 90 between mobile telecommunication terminal 10 and first base station 25 of mobile wireless network 1. Above this, there is a data security layer (also referred to according to the UMTS standard as a "data connection layer") and is divided into multiple sublayers and implements various logical connections between mobile telecommunications terminal 10 and first higher-level network unit 50, which is designated as a "radio network controller" (RNC) according to the UMTS standard. Such a sublayer is referred to, according to the UMTS standard, as the wireless connection control layer, also known as "radio connection control" layer (RLC), in which a first RLC protocol 120 in mobile telecommunications terminal 10 and a second RLC protocol 25 in first higher-level network unit 50 implement a first logical RLC connection 101 as one of the aforementioned logical connections. Another sublayer is referred to as the "packet data convergence protocol" layer (PDCP) according to the UMTS standard. In this sublayer, a first PDCP protocol 130 in mobile telecommunications terminal 10 and a second PDCP protocol 135 in the first higher-level network unit 55 implement a first logical PDCP connection 102. Additional protocols, such as the Radio Resource Control (RRC) protocol, the Internet Protocol IP, the Transit Control Protocol (TCP) and the like may establish additional logical connections in the higher hierarchical layers such as the network layer and the transport layer. As shown in FIG. 2, adjacent layers in the hierarchical model are connected together, with higher-level layers using the services of the respective adjacent lower-level layers. Second physical layer 115 is connected via the first fixed network connection to first higher-level network unit 50, as shown in FIG. 1, and is connected to second RLC protocol 125.

The publication "Technical Specification 25.301, UMTS Radio Interface Protocol Architecture" refers to the corresponding UMTS protocol architecture of layers 2 and 3, which also include the packet data convergence protocol layer. For example, this publication refers to the packet data convergence protocol layer and its position within this architecture. The publication "Technical Specification 25.323 refers to PDCP protocol 130, 135, Packet Data Convergence Protocol".

One function of PDCP protocol 130, 135 is to compress packet data control information, which has been added by the protocols of the transport layer and network layer situated above the packet data convergence protocol layer to the user data, which has also been combined into data units or packet data units in the packet data protocol layer before its transmission, of an application which is also running at a higher level than the packet data convergence protocol layer and which should be compressed before transmission via first air interface 90 to permit efficient transmission.

This compression may be accomplished in various ways. Compression algorithms are specified, for example, in the publication IETF, RFC 1144 or in the publication IETF, RFC 2507. Most efficient compression algorithms make use of the fact that there is little or no difference in the packet data control information in successive packet data units of a certain data type. Differential coding is used for the packet data control information, decompressing the packet data control information of the first packet data unit of a first data type or of other reference packet data and transmitting, for all other packet data units of this data type, the difference in comparison with the preceding packet data control information or other reference packet data control information. The data types of the packet data units may be, for example, the transport and network layer protocols used. For example, a first type of data may be predefined by a TCP/IP protocol and a second type of data may be predefined by a UDP/IP protocol (User Datagram Protocol).

To permit efficient encoding or compression of the packet control information even when a packet data stream is composed of packet data units of different types of data, a table is created on the receiving end and the transmitting end during encoding with the packet data control information of the various types of data being stored in this table. For each packet data unit to be compressed, it is first checked in the table whether a similar or identical entry has already been stored there. If this is the case, then the differential coding is executed between the new packet data control information and that in the table and the information transmitted to the decompressor or the receiving end includes not only the difference, but also reference to the table entry for which the differential coding has been used. If no suitable entry is found on the transmitting end in the table, the packet data unit is interpreted as a new type of data. In addition, the respective packet data control information is included as a new entry in the table and transmitted without compression. The receiver also includes this packet in its table.

For efficient compression of packet data control information of packet data streams, tables which are also referred to as compression tables or code books, are created during compression on the transmitting end and on the receiving end. These code books make it possible for the differential coding described here to be implemented. To be able to decode such differentially coded packet data control information, the tables on the transmitting end and the receiving end must always be identical.

The cellular mobile wireless network offers the possibility of data transmission from mobile telecommunications terminal 10 to a unit of mobile wireless network 1 even if the user of mobile telecommunications terminal 10 leaves the wireless cell which is covered by first base station 25. To do so, a method of transfer of the connection thus established for data transmission from first base station 25 to second base station 30 is implemented between mobile telecommunications terminal 10 and mobile wireless network 1, assuming that the user of mobile telecommunications terminal 10 is moving into the wireless cell covered by second base station 30. This change in connection as described here is also referred to as "relocation."

When relocation occurs, it may now happen that second base station 30 to which the connection is to be transferred may be connected to a different higher-level network unit than the previous first base station 25. This is the case in the exemplary embodiment described here, according to which second base station 30, in contrast with first base station 25, is connected to second higher-level network unit 55.

Each protocol always exists at least twice on the same protocol layer level in different network units, just as the RLC protocol and the PDCP protocol in FIG. 2 exist in both mobile telecommunications terminal 10 and in first higher-level network unit 50. Specifically PDCP protocols 131, 135 are implemented in mobile telecommunications terminal 10 according to the UMTS standard as described above and also in first higher-level network unit 50 as well as in additional higher-level network units, which are designed as RNC. In the case of the relocation described here, the existing data connection between mobile telecommunications terminal 10 and mobile wireless network 1 is shifted so that it runs over second base station 30 and second higher-level network unit 55. Thus, before the relocation, first PDCP protocol 130 in mobile telecommunications terminal 10 transmits to second PDCP protocol 135 in first higher-level network unit 55 over first logical PDCP connection 102, and after the relocation, it transmits to a third PDCP protocol 136 of second higher-level network unit 55 according to FIG. 3.

The problem is that during encoding of the packet data control information in first higher-level network unit 50 by second PDCP protocol 135, a code book has been created which is not initially available in second higher-level network unit 55 and therefore is not usable by third PDCP protocol 136 there. Then if packet data control information is differentially coded by first PDCP protocol 130 in mobile telecommunications terminal 10 using the code book created in mobile telecommunications terminal 10, the corresponding packet data control information cannot be decoded or decompressed by third PDCP protocol 136 of second higher-level network unit 55 because there is no code book there or the entries in the code book which is there do not match those in mobile telecommunications terminal 10.

One answer to this problem is to reset the PDCP protocol units provided for creation of the required PDCP profiles in second higher-level network unit 55 and in mobile telecommunications terminal 10. Nothing need be done for this in second higher-level network unit 55 because the corresponding PDCP protocol unit there is reestablished with each change in connection and therefore is automatically reset. In mobile telecommunications terminal 10, however, the corresponding PDCP protocol unit must be reset explicitly, and all the code books it has used must be deleted and the first PDCP protocol 130 reset to its original state. This method has the disadvantage that after a change in connection, it is necessary to recreate code books in second higher-level network unit 55 and in mobile telecommunications terminal 10, and the first packet data control information of each type of data to be encoded is at first decoded and decompressed and is thus transmitted inefficiently.

Thus, the present invention the transmission of transmission-specific information such as code books created during a connection, in a change of connection from first higher-level network unit 52 to second higher-level network unit 55.

This has the advantage that efficient transmission over a second air interface 90 according to FIG. 1 is also possible even after the relocation without having to first transmit the first packet data control information of each type of data in decoded and thus decompressed form. The transmission-specific information is transmitted from first higher-level network unit 50 either directly over seventh fixed network connection 87 or over fifth fixed network connection 85, highest network unit 60 and sixth fixed network connection 86 to the second higher-level network unit when changing connection. The resulting increased burden on aforementioned fixed network connections 85, 86, 87 when changing connection is not significant because in the case of small code books, the amount of data to be transmitted is small and fixed network connections 85, 86, 87 allow the use of a much higher data rate than second air interface 91 between mobile telecommunications terminal 10 and second base station 30.

In addition, it is also possible, before or during establishment of the connection on the part of mobile telecommunications terminal 10 of first higher-level network unit 50, to provide for signaling whether in the case of a relocation the transmission-specific information is to be transmitted from first higher-level network unit 50 to the corresponding new higher-level network unit or whether the PDCP protocol unit in mobile telecommunications terminal 10 is to be reset as described. It is also possible for first higher-level network unit 50 to send a signal to mobile telecommunications terminal 10 to indicate whether in the case of a relocation the transmission-specific information is to be sent from first higher-level network unit 50 to second higher-level network unit 55. Corresponding signaling information may be added to a message transmitted from first higher-level network unit 50 to mobile telecommunications terminal 10 to make a wireless transmission carrier available for the connection to be established, this message also being designated as a "radio bearer setup" message according to the UMTS standard.

Another possibility is to perform corresponding signaling immediately before or during the relocation to be implemented.

An exemplary embodiment according to the present invention is thus based on a concrete and exemplary scenario in which mobile telecommunications terminal 10 is connected to units of mobile wireless network 1 such as first base station 25, first higher-level network unit 50 and highest network unit 60 via the required physical and logical connections, in particular first logical PDCP connection 102 implemented by first PDCP protocol 130 and second PDCP protocol 135 between mobile telecommunications terminal 10 and first higher-level network unit 50, and a transfer of data, i.e., an exchange of packet data units, is taking place over these connections.

Figure 3:
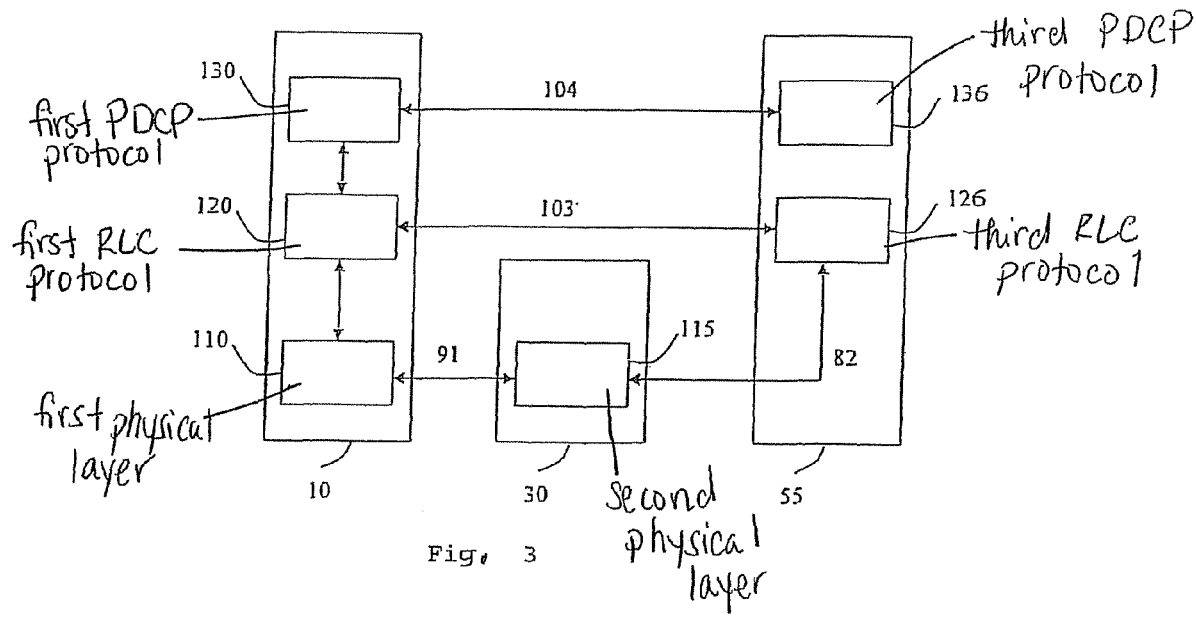
FIG. 3 is a block diagram showing a connection between the mobile station and the second higher-level network unit over a second base station after a change in connection.

Because of their functionality, first PDCP protocol 130 and second PDCP protocol 135 store information which is needed for compression and manipulation of user data and packet data control information. To permit proper functioning of these two PDCP protocols 130, 135, a portion of this transmission-specific information in the two PDCP protocols 130, 135 must be synchronized or must even be identical. If mobile telecommunications terminal 10 then changes the wireless cell in mobile wireless network 1, e.g., because of the movement of mobile telecommunications terminal 10 out of the transmission range of first base station 25 into a new wireless cell, a relocation is implemented and a new physical connection is established between mobile telecommunications terminal 10 and second base station 30, which covers the new wireless cell. This new physical connection corresponds to second air interface 91 according to FIGS. 1 and 3. FIG. 3 illustrates the connection of mobile telecommunications terminal 10 to second higher-level network unit 55 over second base station 30, with the same reference numbers denoting the same elements as in FIG. 2. Second base station 30 according to FIG. 3 is connected to second higher-level network unit 55 or its RLC protocol, which is identified here as third RLC protocol 126, over second fixed network connection 82. Second higher-level network unit 55 is structured like first higher-level network unit 50 and has third PDCP protocol 136 accordingly in addition to third RLC protocol 126. Second base station 30 is connected to second higher-level network unit 55 which is different from first higher-level network unit 50 in mobile wireless network 1, as described above. The logical connections between mobile telecommunications terminal 10 and second higher-level network unit 55 are thus also established anew. A second logical RLC connection 103 is established between first RLC protocol 120 and third RLC protocol 126. A second logical PDCP connection 104 is established between first PDCP protocol 130 and third PDCP protocol 136. First logical PDCP connection 103 is thus replaced by second logical PDCP connection 104. To do so, third PDCP protocol 136 must first be generated anew in second higher-level network unit 55 after the relocation.

To now permit a correct data flow over second logical PDCP connection 104, first PDCP protocol 130 must first be synchronized again in mobile telecommunications terminal 10 and third PDCP protocol 136 must be synchronized again in second higher-level network unit 55. A method of doing so is to reset first PDCP protocol 130 in mobile telecommunications terminal 10 to a defined starting state, which corresponds to the starting state of third PDCP protocol 136 which is created anew with the relocation, whereupon first PDCP protocol 130 and third PDCP protocol 136 then contain the same transmission-specific information.

An exemplary embodiment according to the present invention, however, proposes a method in which the transmission-specific information of second PDCP protocol 135 is transmitted from first higher-level network unit 50 to a third PDCP protocol unit in second higher-level network unit 55 to produce a third PDCP protocol 136 having the transmission-specific information of second PDCP protocol 135. Then it is not necessary to reset first PDCP protocol 130. Therefore, the compression methods of first PDCP protocol 130 and second PDCP protocol 135 may also be applied continuously between first PDCP protocol 130 and third PDCP protocol 136 without resetting the latter two PDCP protocols 130, 136. This results in a considerable data reduction at second air interface 91 in comparison with resetting first PDCP protocol 130 and third PDCP protocol 136 because the transmission-specific information need not be created anew and gradually transmitted over second air interface 91 only to achieve the same or a similar status of the transmission-specific information in first PDCP protocol 130 and in third PDCP protocol 136 as that achieved at the end of the connection of mobile telecommunications terminal 10 with second higher-level network unit 55.

Now the relevant methods when changing connection from the wireless cell of first base station 25 to the wireless cell of second base station 30 will be described as an example.

In establishing the connection between mobile telecommunications terminal 10 and units 50, 60 of mobile wireless network 1 via first base station 25, various parameters for establishing the connection between these units 50, 60 of mobile wireless network 1 and mobile telecommunications terminal 10 will be discussed. These parameters also include the compression algorithm used for compression of the protocol control information, the allowed length of the code books and the quality service of the connection.

According to an exemplary embodiment of the present invention, another parameter, which defines whether the PDCP protocol created in the new higher-level network unit is to be reset when changing connection from the first higher-level network unit 50 to a new higher-level network unit which is different from the first higher-level network unit or whether the transmission-specific information present and already built up is to be transmitted from first higher-level network unit 50 to the new higher-level network unit may be added to this parameter negotiation. The signaling required accordingly for the parameter negotiation may in the simplest case be accomplished with one bit which is added to a message to be sent to first higher-level network unit 50 for the parameter negotiation or which is added to a message to be sent from first higher-level network unit 50 for the parameter negotiation and whose two states signal the information "PDCP protocol is reset" or "transmission-specific information is transmitted when relocation takes place." In this example, the bit is set at "transmission-specific information is transmitted when relocation takes place."

Figures 4A, 4B:
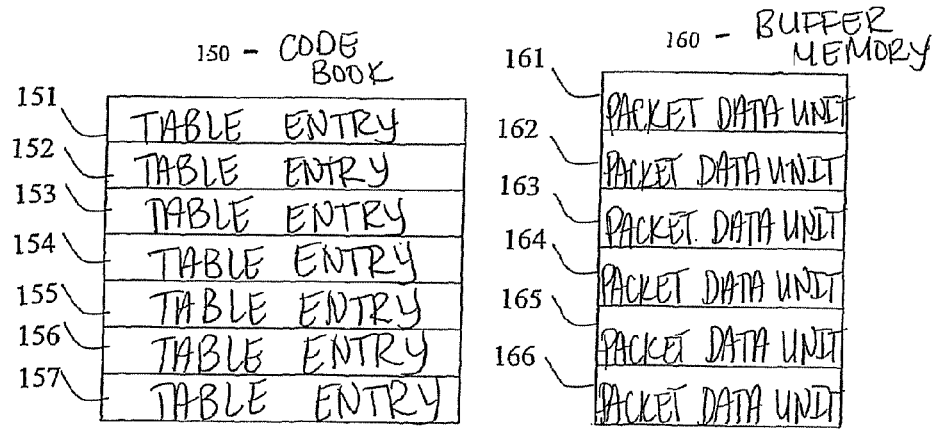
FIG. 4a is a compression table.
FIG. 4b shows a buffer memory for data units.

Packet data units generated by an application are transferred in first higher-level network unit 50 by a TCP protocol and an IP protocol to the corresponding PDCP protocol unit, which is at a lower level in the layer sequence, which compresses it and next it is transferred to corresponding second RLC protocol 125 which is at a lower level in the layer sequence of the PDCP protocol unit. The packet data units are in addition stored in a buffer memory 160 in the PDCP protocol unit of first higher-level network unit 50 according to FIG. 4b until the RLC unit of first higher-level network unit 50 which is responsible for the implementation of second RLC protocol 125 acknowledges the correct transmission of the packet data units to mobile telecommunications terminal 10. Let us assume that (m−1) packet data units have been transferred in compressed form by PDCP protocol unit of first higher-level network unit 50 to its RLC unit and acknowledged by this before the point in time when the relocation takes place. Another six packet data units m, m+1, . . . , m+5 have also been transferred to this RLC unit, but have not been acknowledged and are therefore still in buffer memory 160. Packet data units m, m+1, . . . , m+5 here are labeled with reference notation 161, 162, 163, 164, 165, 166. In compression of the packet control information, a code book 150 has been created as a compression table, which in this example has n entries according to FIG. 4a, labeled with reference numbers 151, 152, 153, 154, 155, 156, 157.

At the time when the relocation initiated by first higher-level network unit 50 or mobile telecommunications terminal 10 is to take place, the protocols necessary to maintain the data transmission, such as third RLC protocol 126 and third PDCP protocol 136, are generated in second higher-level network unit 55 as the new higher-level network unit after the relocation.

Then, according to an exemplary embodiment of the present invention, the updated transmission-specific information stored in the PDCP protocol unit of first higher-level network unit 50, i.e., in this example code book 150, and the content of buffer memory 160 are transmitted from first higher-level network unit 50 to second higher-level network unit 55. To do so, seventh fixed network connection 87 between the two higher-level network units 50, 55 may be used if it exists or the transmission-specific information may be sent from first higher-level network unit 50 to second higher-level network unit 55 over fifth fixed network connection 85, highest network unit 60 and sixth fixed network connection 86. After the transmission-specific information has been sent to third PDCP protocol 136, this third PDCP protocol 136 represents an exact copy of second PDCP protocol 135 of first higher-level network unit 50 directly before the relocation with regard to second logical PDCP connection 104 between PDCP protocol units of mobile telecommunications terminal 10 and second higher-level network unit 55, and the data transmission of the packet data units may be started again essentially directly or continued from the state, as it existed most recently before the relocation.

For the transmission-specific information to be transmitted from first higher-level network unit 50 to second higher-level network unit 55, code book 150 and the content of buffer memory 160 are mentioned only as examples. Similarly, the transmission-specific information to be transmitted may alternatively or additionally also contain other information, e.g., information regarding compression of the user data in the packet data units to be transmitted within the framework of the connection established, this information actually being formed by code books accordingly.

What is claimed is:

1. A method of operating a mobile wireless network within which user data is transmitted between a mobile station and a first base station, the user data being combined into data units prior to a transmission of the data units, the method comprising:

storing transmission-specific information related to an instantaneous state of the transmission of the data units in both the mobile station and in a first network unit, the first network unit being at a level that is higher than a level of the first base station; and transmitting the transmission-specific information stored in the first network unit to a second network unit of a second base station when the mobile station relocates from the first base station to the second base station, the second network unit having a level that is higher than the level of the second base station to continue the transmission of the data units after the mobile station relocates from the first base station to the second base station;

wherein the data units include packet data units, and wherein the first network unit further includes a first unit of a first convergence protocol layer, the second network unit further includes a second unit of a second convergence protocol layer, and the transmitting of the transmission-specific information includes transmitting the information via the first unit of the first convergence protocol layer to the second unit of the second convergence protocol layer when the mobile station relocates from the first base station to the second base station.

2. The method according to claim 1, wherein during relocation, the transmission-specific information in the first network unit and data units intermediately stored for control purposes are transferred to the second higher level network unit.

3. The method according to claim 1, wherein the transmitting of the transmission-specific information includes transmitting over a fixed network when the mobile station relocates from the first base station to the second base station.

4. A method of operating a mobile wireless network within which user data is transmitted between a mobile station and a first base station, the user data being combined into data units prior to a transmission of the data units, the method comprising:

storing transmission-specific information related to an instantaneous state of the transmission of the data units in both the mobile station and in a first network unit, the first network unit being at a level that is higher than a level of the first base station; and transmitting the transmission-specific information stored in the first network unit to a second network unit of a second base station when the mobile station relocates from the first base station to the second base station, the second network unit having a level that is higher than the level of the second base station to continue the transmission of the data units after the mobile station relocates from the first base station to the second base station;

wherein the data units include packet data units, and wherein the data units include packet data units, and wherein during relocation, the transmission-specific information in the first network unit and data units intermediately stored for control purposes are transferred to the second higher level network unit.

5. The method according to claim 4, wherein the first network unit further includes a first unit of a first convergence protocol layer, the second network unit further includes a second unit of a second convergence protocol layer, and the transmitting of the transmission-specific information includes transmitting the information via the first unit of the first convergence protocol layer to the second unit of the second convergence protocol layer when the mobile station relocates from the first base station to the second base station.

6. The method according to claim 5, wherein the transmitting of the transmission-specific information includes transmitting over a fixed network when the mobile station relocates from the first base station to the second base station.

7. A method of operating a mobile wireless network within which user data is transmitted between a mobile station and a first base station, the user data being combined into data units prior to a transmission of the data units, the method comprising:

storing transmission-specific information related to an instantaneous state of the transmission of the data units in both the mobile station and in a first network unit, the first network unit being at a level that is higher than a level of the first base station; and transmitting the transmission-specific information stored in the first network unit to a second network unit of a second base station when the mobile station relocates from the first base station to the second base station, the second network unit having a level that is higher than the level of the second base station to continue the transmission of the data units after the mobile station relocates from the first base station to the second base station;

wherein the data units include packet data units, and wherein the first network unit further includes a first unit of a first convergence protocol layer, the second network unit further includes a second unit of a second convergence protocol layer, and the transmitting of the transmission-specific information includes transmitting the information via the first unit of the first convergence protocol layer to the second unit of the second convergence protocol layer when the mobile station relocates from the first base station to the second base station, and wherein the transmitting of the transmission-specific information includes transmitting over a fixed network when the mobile station relocates from the first base station to the second base station.

8. A method of operating a mobile wireless network within which user data is transmitted between a mobile station and a first base station, the user data being combined into data units prior to a transmission of the data units, the method comprising:

storing transmission-specific information related to an instantaneous state of the transmission of the data units in both the mobile station and in a first network unit, the first network unit being at a level that is higher than a level of the first base station; and transmitting the transmission-specific information stored in the first network unit to a second network unit of a second base station when the mobile station relocates from the first base station to the second base station, the second network unit having a level that is higher than the level of the second base station to continue the transmission of the data units after the mobile station relocates from the first base station to the second base station;

wherein the data units include packet data units, and wherein the transmission-specific information in the first network unit and data units intermediately stored for control purposes are transferred to the second higher level network unit, and wherein the first network unit further includes a first unit of a first convergence protocol layer, the second network unit further includes a second unit of a second convergence protocol layer, and the transmitting of the transmission-specific information includes transmitting the information via the first unit of the first convergence protocol layer to the second unit of the second convergence protocol layer when the mobile station relocates from the first base station to the second base station.

9. The method according to claim 8, wherein the transmitting of the transmission-specific information includes transmitting over a fixed network when the mobile station relocates from the first base station to the second base station.

* * * * *